United States Patent
Koch et al.

(10) Patent No.: US 11,773,990 B2
(45) Date of Patent: Oct. 3, 2023

(54) MULTI-PORT MULTI-MODE VALVE

(71) Applicants: Michael J. Koch, Roselle, IL (US); Nishaj Attassery, Naperville, IL (US); Kyle William Svejcar, Westchester, IL (US); Eapen Chacko, Glendale Heights, IL (US); Daniel Knapper, Clarkston, MI (US)

(72) Inventors: Michael J. Koch, Roselle, IL (US); Nishaj Attassery, Naperville, IL (US); Kyle William Svejcar, Westchester, IL (US); Eapen Chacko, Glendale Heights, IL (US); Daniel Knapper, Clarkston, MI (US)

(73) Assignee: ROBERTSHAW CONTROLS COMPANY, Itasca, IL (US)

( * ) Notice: Subject to any disclaimer, the term of this patent is extended or adjusted under 35 U.S.C. 154(b) by 0 days.

(21) Appl. No.: 17/336,904

(22) Filed: Jun. 2, 2021

(65) Prior Publication Data
US 2021/0381607 A1     Dec. 9, 2021

Related U.S. Application Data

(60) Provisional application No. 63/035,118, filed on Jun. 5, 2020.

(51) Int. Cl.
*F16K 11/07*     (2006.01)
*F16K 11/076*    (2006.01)

(52) U.S. Cl.
CPC ................... *F16K 11/076* (2013.01)

(58) Field of Classification Search
CPC ................ F16K 11/076; F16K 27/041
See application file for complete search history.

(56) References Cited

U.S. PATENT DOCUMENTS

| | | |
|---|---|---|
| 1,422,178 A | 7/1922 | Cooley |
| 3,251,408 A | 5/1966 | Watson et al. |

(Continued)

FOREIGN PATENT DOCUMENTS

| | | |
|---|---|---|
| CN | 103857436 A | 6/2014 |
| EP | 2713083 A1 | 4/2014 |

(Continued)

OTHER PUBLICATIONS

Forbes, Tesla Goes Open Source: Elon Musk Releases Patents to "Good Faith" Use, Jun. 12, 2014, 3 pages; https://www.forbes.com/sites/bria nsolomon/2014/06/12/tesla-goes-ope n-source-elon-musk-releases-patents-to-good-faith-use/#113922913c63.

(Continued)

*Primary Examiner* — Kevin R Barss
(74) *Attorney, Agent, or Firm* — Reinhart Boerner Van Deuren P.C.

(57) ABSTRACT

Embodiments of a multi-port multi-mode valve are provided. The multi-port multi-plane valve includes a housing which defines an internal cavity. The housing further includes a plurality of ports, including two inlet ports and four outlet ports. Each of the plurality of ports is in communication with the internal cavity. A shell body is rotatably disposed within the internal cavity and provides selectable fluid communications between the ports. A seal member is also provided which has a plurality of openings and surrounds the shell body. Six modes of operation are provided by rotation of the shell body.

19 Claims, 8 Drawing Sheets

(56) References Cited

U.S. PATENT DOCUMENTS

| | | |
|---|---|---|
| 3,692,041 A | 9/1972 | Bondi |
| 3,927,693 A | 12/1975 | Johnston |
| 4,021,190 A | 5/1977 | Dickson |
| 4,429,717 A | 2/1984 | Montgomery |
| 4,574,842 A * | 3/1986 | Cordova ............. F16K 11/0856 137/625.46 |
| 4,655,252 A | 4/1987 | Krumhansl |
| 4,909,933 A | 3/1990 | Carter et al. |
| 4,968,334 A | 11/1990 | Hilton |
| 5,084,031 A | 1/1992 | Todd et al. |
| 5,431,189 A | 7/1995 | Jones |
| 5,529,758 A | 6/1996 | Houston |
| 5,871,032 A | 2/1999 | Ko |
| 5,931,196 A | 8/1999 | Bernardi et al. |
| 6,245,233 B1 | 6/2001 | Lu |
| 6,308,739 B1 | 10/2001 | Barbuto et al. |
| 6,539,899 B1 | 4/2003 | Piccirilli |
| 6,688,333 B2 | 2/2004 | Mclane |
| 7,506,664 B2 | 3/2009 | Norris et al. |
| 7,837,771 B2 | 11/2010 | Barone |
| 8,336,319 B2 | 12/2012 | Johnston et al. |
| 8,347,831 B2 | 1/2013 | Vacca |
| 8,402,776 B2 | 3/2013 | Johnston et al. |
| 8,557,415 B2 | 10/2013 | Herron et al. |
| 8,557,416 B2 | 10/2013 | Mardall et al. |
| 9,212,751 B2 | 12/2015 | McLane et al. |
| 9,481,477 B2 | 11/2016 | Kjar |
| 9,527,403 B2 | 12/2016 | Mardall et al. |
| 9,618,128 B2 | 4/2017 | Dourdeville et al. |
| 9,687,769 B2 | 6/2017 | Mardall et al. |
| 9,701,210 B2 | 7/2017 | Woo et al. |
| 9,865,852 B2 | 1/2018 | Haer et al. |
| 2003/0125673 A1 | 7/2003 | Houde et al. |
| 2004/0221901 A1 | 11/2004 | Chen |
| 2005/0006150 A1 | 1/2005 | Sims et al. |
| 2006/0118066 A1 | 6/2006 | Martins |
| 2006/0237359 A1 | 10/2006 | Lin et al. |
| 2008/0108955 A1 | 5/2008 | Blickhan |
| 2008/0223464 A1 | 9/2008 | Merrell |
| 2010/0319796 A1 | 12/2010 | Whitaker |
| 2011/0155254 A1* | 6/2011 | Swindells ........... F16K 11/0853 137/1 |
| 2011/0296855 A1 | 12/2011 | Johnston et al. |
| 2012/0183815 A1 | 7/2012 | Johnston et al. |
| 2012/0231306 A1 | 9/2012 | Herron et al. |
| 2012/0237803 A1 | 9/2012 | Mardall et al. |
| 2013/0193363 A1 | 8/2013 | Van Den Eijkel et al. |
| 2013/0263949 A1 | 10/2013 | Bartnick et al. |
| 2014/0053931 A1 | 2/2014 | Whitaker |
| 2014/0090414 A1 | 4/2014 | McLane et al. |
| 2014/0193683 A1 | 7/2014 | Mardall et al. |
| 2015/0217622 A1* | 8/2015 | Enomoto ........... B60H 1/00878 62/244 |
| 2015/0217654 A1 | 8/2015 | Woo et al. |
| 2015/0306974 A1 | 10/2015 | Mardall et al. |
| 2015/0354716 A1 | 12/2015 | Morein |
| 2016/0200206 A1 | 7/2016 | Woo et al. |
| 2016/0380248 A1 | 12/2016 | Haer et al. |
| 2017/0056806 A1 | 3/2017 | Mardall et al. |
| 2017/0096073 A1 | 4/2017 | Mardall et al. |
| 2017/0152957 A1 | 6/2017 | Roche et al. |
| 2017/0214008 A9 | 7/2017 | Mardall et al. |
| 2017/0253107 A1 | 9/2017 | Castiglioni et al. |
| 2017/0259200 A1 | 9/2017 | Mardall et al. |
| 2018/0292016 A1 | 10/2018 | Ledvora et al. |
| 2019/0249787 A1* | 8/2019 | Whitaker ............ F16K 11/0856 |
| 2020/0200284 A1 | 6/2020 | Ledvora et al. |
| 2021/0131575 A1 | 5/2021 | Bunda et al. |

FOREIGN PATENT DOCUMENTS

| | | |
|---|---|---|
| EP | 2921750 A1 | 9/2015 |
| FR | 2940396 A1 | 6/2010 |
| GB | 270997 A | 5/1927 |
| JP | 48-000824 | 1/1973 |
| JP | 59-090665 | 6/1984 |
| JP | 2006-118664 | 5/2006 |
| JP | 2011-202738 A | 10/2011 |
| JP | 2015-034560 A | 2/2015 |
| JP | 2018-100682 A | 6/2018 |
| JP | 2019-007567 A | 1/2019 |
| KR | 10-0412805 B1 | 12/2003 |
| KR | 10-1799777 B1 | 11/2017 |

OTHER PUBLICATIONS

Randall et al., Bloomberg Businessweek, Hell for Elon Musk is a Midsize Sedan, Jul. 12, 2018, 15 pages, https://www.bloomberg.com/news/featu res/2018-07-12/how-tesla-s-model-3-beca me-elon-musk-s-version-of-hell.

Tesla Motors Club, Tesla Thermal Management System—explanation, Mar. 25, 2017, 11 pages, https://teslamotorsclub.com/tmc/threads/tesla-thermal-management-system-explanation.88055/.

* cited by examiner

MULTI-PORT MULTI-MODE VALVE

CROSS-REFERENCE TO RELATED PATENT APPLICATIONS

This patent application claims the benefit of U.S. Provisional Patent Application No. 63/035,118, filed Jun. 5, 2020, the entire teachings and disclosure of which are incorporated herein by reference thereto.

FIELD OF THE INVENTION

This invention generally relates to multi-port valves, and more particularly to multi-port valves having multiple inlet and outlet ports to control flow in different modes of operation.

BACKGROUND OF THE INVENTION

Multi-port valves are used in a variety of industries and applications. Such valves include one or more inlet ports and one or more outlet ports. A valve member disposed within a housing of the valve is responsible for governing the flow between the various ports. A portion of the valve member, e.g. a valve stem, protrudes from the housing and is acted upon by an actuator attached to the multi-port valve. As result, the actuator governs the position of the valve member within the housing, which in turn governs the flow between the various ports.

Such multi-port valves advantageously provide a single flow device which can effectively replace multiple flow devices which only employ a single inlet and a single outlet. However, such multi-port valves are not without their own drawbacks. For example, the overall complexity of the valve increases as the number of ports increases. This can lead to relatively high part count assemblies. Further, this complexity in construction also results in a more complex manufacturing process for making the valve. Indeed, the multiple ports are associated with multiple inlets and outlets of the valve which must be welded onto a housing. Further the desired fitting for each inlet and outlet must also be welded on to its respective inlet or outlet.

Such welded up assemblies increase the number of potential leak paths of the valve. Further, to achieve such welds, special machining steps are often needed at the inlets and outlets as well as the housing to ensure there is a tight fit between these components for subsequent welding.

Furthermore, a number of individual seals are required to effectively seal the various ports of the multi-port valve off from one another. These multiple seals also lead to an increase in overall cost and complexity of the multi-port valve.

Multi-port valves that overcome these issues are available from the assignee of the instant application, and are described in U.S. Pat. No. 9,212,751 ("Valve System And Method" by Allan R. McLane et al.), issued Dec. 15, 2015, co-pending U.S. patent application Ser. No. 15/945,173 (Publication No. 2018/0292016, "Multi-Port Valve" by Joe Ledvora et al.), filed Apr. 4, 2018, and claiming priority to U.S. Provisional Application No. 62/483,167, filed Apr. 7, 2017, co-pending U.S. patent application Ser. No. 16/719,629 ("Multi-Port Multi-Plane Valve" by Joe Ledvora et al.), filed Dec. 18, 2019, and claiming priority to U.S. Provisional Application No. 62/782,155 filed Dec. 19, 2018, co-pending U.S. patent application Ser. No. 16/668,831, ("Multi-Port Valve With Partial Circumferential Seal Arrangement" by Andrzej Bunda et al.) filed Oct. 30, 2019, the teachings and disclosure of which are hereby incorporated in their entireties by reference thereto.

With the simplification of the integrated construction and manufacture, and the advanced flow logic control enabled by the above incorporated designs, an increased demand for such integrated multi-port valves with increasingly complex flow logic control modes and architectures has emerged. This need has been driven, for example, by the increasingly complex thermal management systems needed in modern electric vehicles to accommodate the various modes of operation thereof. These various modes of operation require different thermal management loops to be engaged, often requiring different coolant pumps to operate in order to charge the proper coolant loops to accommodate the different thermal loads presented during the different modes of operation. Unfortunately, since the various coolant pumps may only be needed during certain modes of operation of the electric vehicle, many of these pumps simply represent an unacceptable increase in cost and weight of the overall thermal management system.

Accordingly, there is a need in the art for a multi-port valve that provides multi-mode fluid flow logic and control within the volume of the valve itself in order to enable the elimination of some of the coolant pumps while still enabling proper coolant flow during the different modes of operation in the different thermal management loops. Embodiments of the present invention provide such a multi-port multi-mode valve. These and other advantages of the invention, as well as additional inventive features, will be apparent from the description of the invention provided herein.

BRIEF SUMMARY OF THE INVENTION

In one aspect, embodiments of the present invention provide a multi-port multi-mode valve having a reduced part count and a reduced cost relative to prior designs, and that provides multi-mode fluid flow logic and control required by multi-loop thermal management systems. An embodiment of such a multi-port multi-mode valve includes a housing defining an internal cavity.

The housing further defines a plurality of ports, preferably including two dedicated input ports and four output ports. Each of the plurality of ports is in communication with the internal cavity. In one embodiment the ports are arranged in a non-symmetrical fashion around the periphery relative to adjacent ports. In one embodiment the ports are arranged in a symmetrical fashion around the periphery relative to opposite ports. In one embodiment the inlet ports are arranged in a symmetrical fashion around the periphery of the housing and divide the outlet ports. In one embodiment the outlet ports are arranged in a non-symmetrical fashion around the periphery of the housing and in a symmetrical fashion on each half of the housing relative to inlet ports.

In one embodiment the cross-sectional flow area of each of the inlet ports differ from the cross-sectional flow area of each of the outlet ports. Preferably, the cross-sectional flow area of each of the inlet ports is larger than the cross-sectional flow area of each of the outlet ports.

A preferred embodiment also includes a shell body rotatably disposed within the internal cavity. This shell body is configured to provide flow control logic between different ports based on its angular position within the valve housing. In certain embodiments according to this aspect, the shell body includes a plurality of passageways extending through the shell body. In one embodiment, the cross-sectional flow area of each of the passageways is approximately equal to the cross-sectional flow area of each of the outlet ports.

A seal member is also provided which has a plurality of openings and surrounds the shell body such that it circumscribes the shell body within the internal cavity. In certain embodiments, each opening of the plurality of openings of the seal member is associated with one of the plurality of ports such that each of the plurality of ports are sealed from one another along the outer periphery of the seal member.

In one embodiment the openings formed through the seal member and associated with the inlet ports are configured differently from the openings formed through the seal member and associate with the outlet ports. Preferably, the openings formed through the seal member and associated with the inlet ports are configured to increase the cross-sectional flow area to which the shell body is exposed compared to the cross-sectional flow area of each of the inlet ports themselves. Preferably, the openings formed through the seal member and associated with the outlet ports are configured to maintain the cross-sectional flow area to which the shell body is exposed compared to the cross-sectional flow area of each of the outlet ports themselves.

In one embodiment, the cross-sectional flow area of each of the passageways is approximately equal to half of the cross-sectional flow area to which the shell body is exposed at each of the inlet ports. In one embodiment an area between each end of each of the passageways is approximately equal to the cross-sectional flow area of each of the outlet ports.

In certain embodiments, the seal member seals outwardly in a radial direction against an interior surface of the housing. In other embodiments, the seal member includes a plurality of seal ribs which seal against the shell body. The seal member may be one of a continuous piece of elastomeric material, a plurality of pieces of elastomeric material, or comprises a rigid core with a plurality of elastomeric seals attached thereto.

In one embodiment, the configuration of the ports of the housing and the passageways of the shell body, as engaged by the seal member, provides flow logic the enables a plurality of modes of operation. In an embodiment having two inlet ports and four outlet ports, the flow logic provides six modes of operation. In one embodiment, the flow logic allows flow from each of the inlet ports to each of the outlet ports individually in different modes of operation. In one embodiment, the flow logic prevents flow from each of the inlet ports to each of the outlet ports individually in different modes of operation. In one embodiment the flow logic allows flow from each of the inlet ports to a combination of the outlet ports in different modes of operation In a first mode of operation, the flow logic directs fluid flow from a first inlet port to a first outlet port, from a second inlet port to a fourth outlet port, and blocks fluid flow to the second outlet port and the third outlet port.

In a second mode of operation, the flow logic directs fluid flow from a first inlet port to a first outlet port and a second outlet port, and from a second inlet port to a third outlet port and a fourth outlet port.

In a third mode of operation, the flow logic directs fluid flow from a first inlet port to a second outlet port, from a second inlet port to a third outlet port, and blocks fluid flow to the first outlet port and the fourth outlet port.

In a fourth mode of operation, the flow logic directs fluid flow from a first inlet port to a fourth outlet port, from a second inlet port to a first outlet port, and blocks fluid flow to the second outlet port and the third outlet port.

In a fifth mode of operation, the flow logic directs fluid flow from a first inlet port to a third outlet port and a fourth outlet port, and from a second inlet port to a first outlet port and a second outlet port.

In a sixth mode of operation, the flow logic directs fluid flow from a first inlet port to a third outlet port, from a second inlet port to a second outlet port, and blocks fluid flow to the first outlet port and the fourth outlet port.

A six port valve of one embodiment is used to direct and/or prohibit flow of an aqueous solution through a cooling system. The six port valve has six modes capable of switching flow directions from various loops in the cooling system in which it is used in an exemplary operating environment while also providing a means to shut off selected loops, providing increasingly complex valve architectures and flow logic.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the figures, as will be understood from the following, embodiments of a multi-port multi-mode valve assembly and its associated multi-port multi-mode valve are described herein. The multi-port multi-mode valve advantageously overcomes existing problems in the art by presenting an overall construction with a reduced part count, a reduced number of potential leak paths, a reduction in overall assembly time and cost, and reduced external plumbing to provide fluid flow logic and control in, e.g., a thermal management system for an electric vehicle with a reduced number of fluid pumps.

Figure 1:
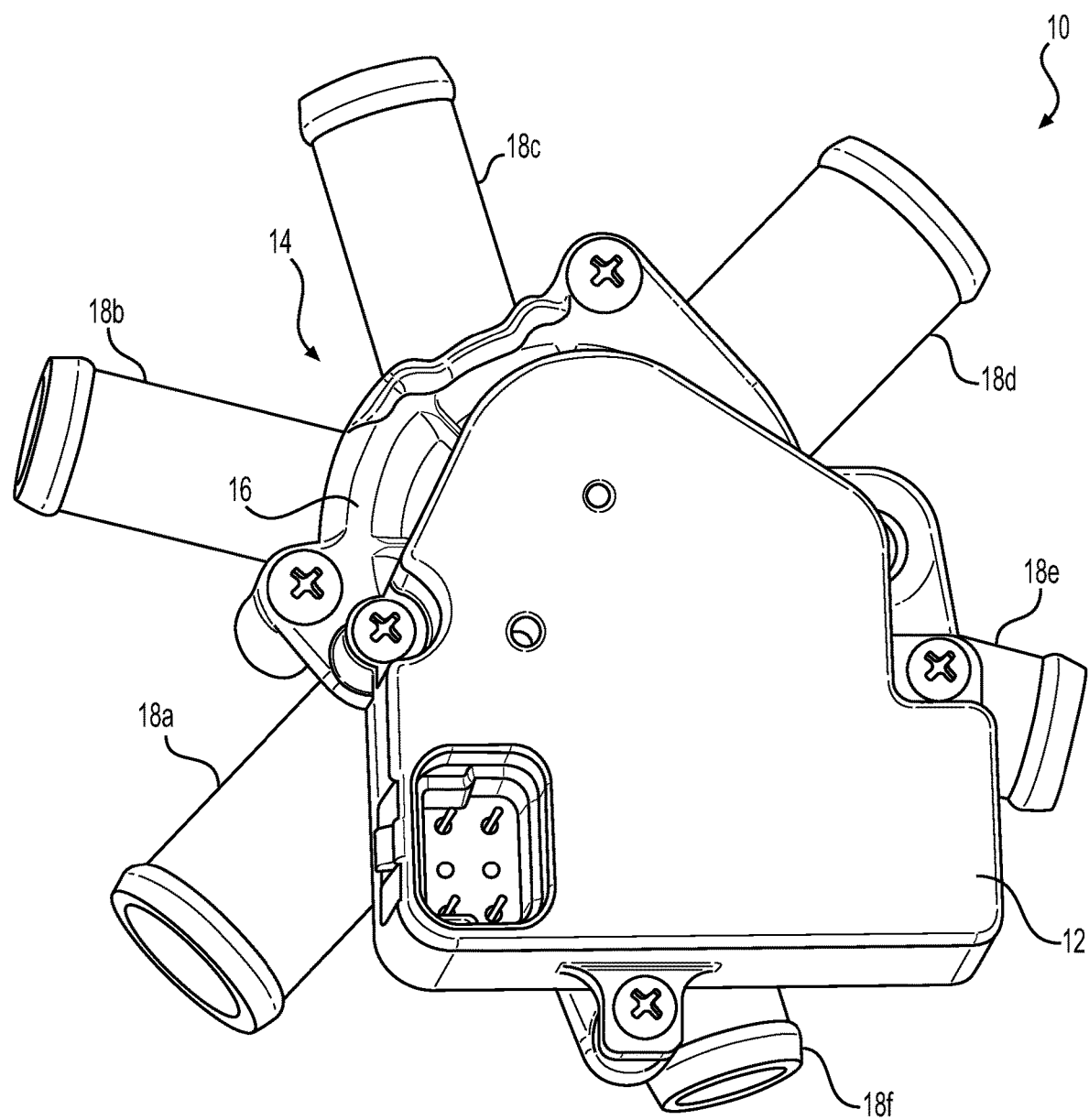
FIG. 1 is top isometric illustration of an embodiment of an assembled multi-port, multi-mode valve constructed in accordance with the teachings of the present invention including a valve controller.
Figure 2:
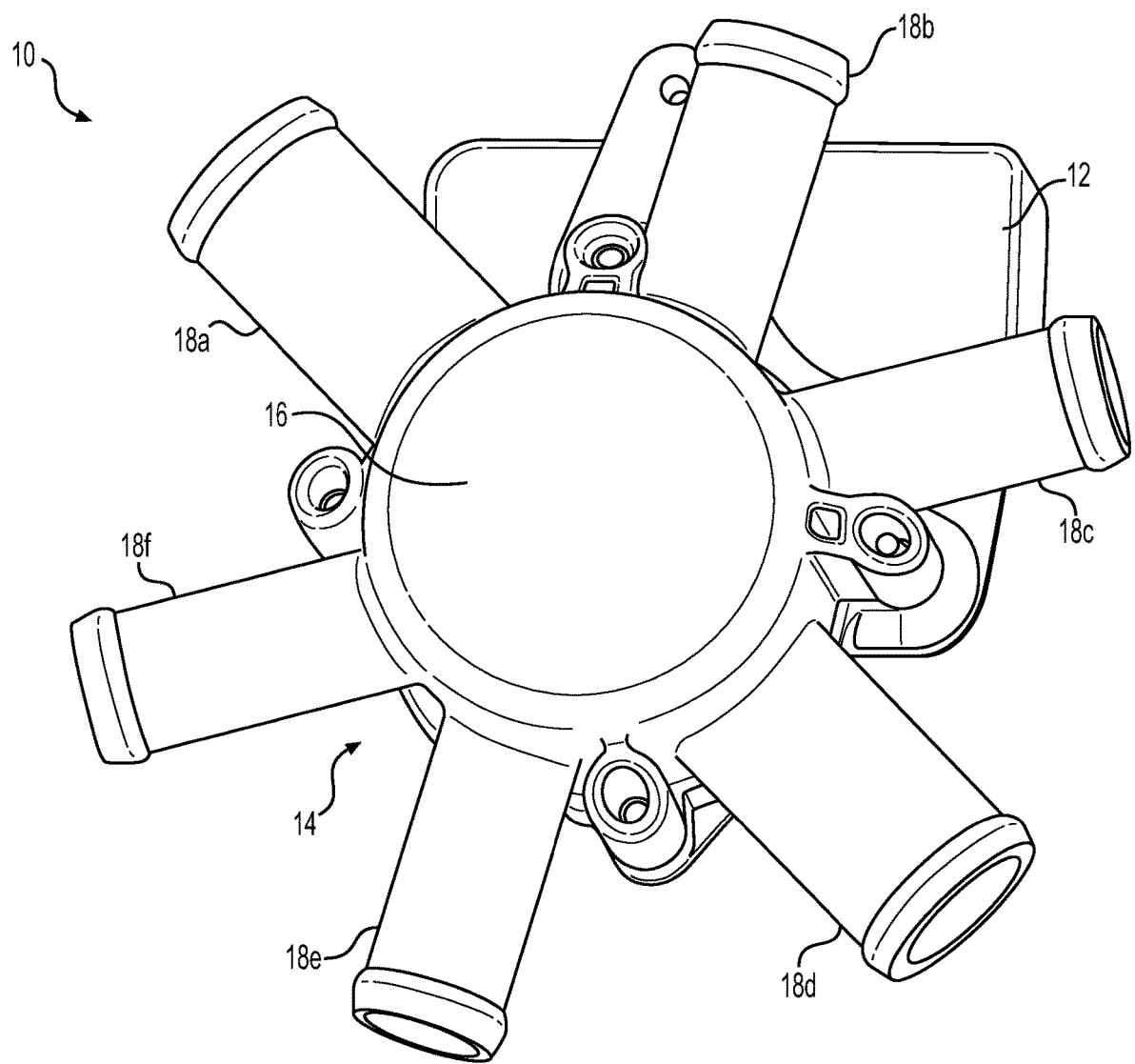
FIG. 2 is bottom isometric illustration of an embodiment of the multi-port, multi-mode valve shown in FIG. 1.

As discussed in the above identified patent and co-pending U.S. patent applications, the teachings and disclosure of which is hereby incorporated in their entireties by reference thereto, multi-port valve assemblies 10 typically, as here, include an actuator 12 shown in FIG. 1 and FIG. 2 mounted to the multi-port valve 14. The actuator 12 is responsible for actuating a valve member (i.e., a shell body as described below) which in turn governs the flow logic that determines the flow characteristics through the valve 14. The actuator 12 may be any style of actuator typically used in valve actuation, e.g., rotary, linear, etc., and may rely on any type of power source typically used in valve actuation, e.g., electric, hydraulic, and pneumatic, etc. Monitoring of the rotational position of the valving member may also utilize any type of position sensing, e.g., via a Hall-effect sensor, potentiometer, stepper motor control, etc. As such, the actuator 12 and position sensing are non-limiting on the invention herein.

As shown in FIGS. 1 and 2, an embodiment of the multi-port multi-mode valve 14 includes a housing 16 and an actuator 12 mounted thereto. In one advantageous implementation of the invention, the housing 16 is formed as a single piece. By "formed as a single piece," it is meant that the main body of housing 16 and its associated ports 18a-f are not an assembly of separate components which are subsequently joined together by a joining process, e.g., welding, as is done in conventional valve housings. Rather, housing 16 is formed as a single unitary piece by any process capable of achieving such a configuration, e.g. injection molding, 3D printing, etc. However, it is contemplated by the teachings herein that housing 16 may be embodied as an assembly of separate components which are subsequently joined together by a joining process.

As illustrated, housing 16 includes a plurality of ports 18a-f, in particular, a first port 18a, a second port 18b, a third port 18c, a fourth port 18d, a fifth port 18e, and a sixth port 18f that lie in a single plane, although other embodiments may position the axis of each port 18a-f in a different plane without departing from the present invention. Each of the ports 18a-f are in fluid communication with an internal cavity of housing 16 as will be discussed further below. While each of the ports 18a-f may function as an inlet or an outlet, or both, of the valve 14, the following description of one embodiment in an exemplary operating environment of a thermal management system for an electric vehicle having multiple coolant loops and a reduced number of coolant pumps that otherwise would be required, will discuss ports 18a and 18d (labeled in the cross-sectional illustrations of FIGS. 3-8 discussed below) as input ports and ports 18b, 18c, 18e, 18f as output ports.

In one embodiment, the ports 18a-f are arranged in a non-symmetrical fashion around the periphery relative to adjacent ports. In one embodiment, the ports 18a-18f are arranged in a symmetrical fashion around the periphery relative to opposite ports. In one embodiment, the inlet ports 18a, 18d are arranged in a symmetrical fashion around the periphery of the housing 16 and divide the outlet ports 18b, 18c, 18e, 18f. In one embodiment the outlet ports 18b, 18c, 18e, 18f are arranged in a non-symmetrical fashion around the periphery of the housing 16 and in a symmetrical fashion on each half of the housing 16 relative to inlet ports 18a, 18d.

In one embodiment, the cross-sectional flow area of each of the inlet ports 18a, 18d differ from the cross-sectional flow area of each of the outlet ports 18b, 18c, 18e, 18f. Preferably, the cross-sectional flow area of each of the inlet ports 18a, 18d is larger than the cross-sectional flow area of each of the outlet ports 18b, 18c, 18e, 18f.

Figure 3:
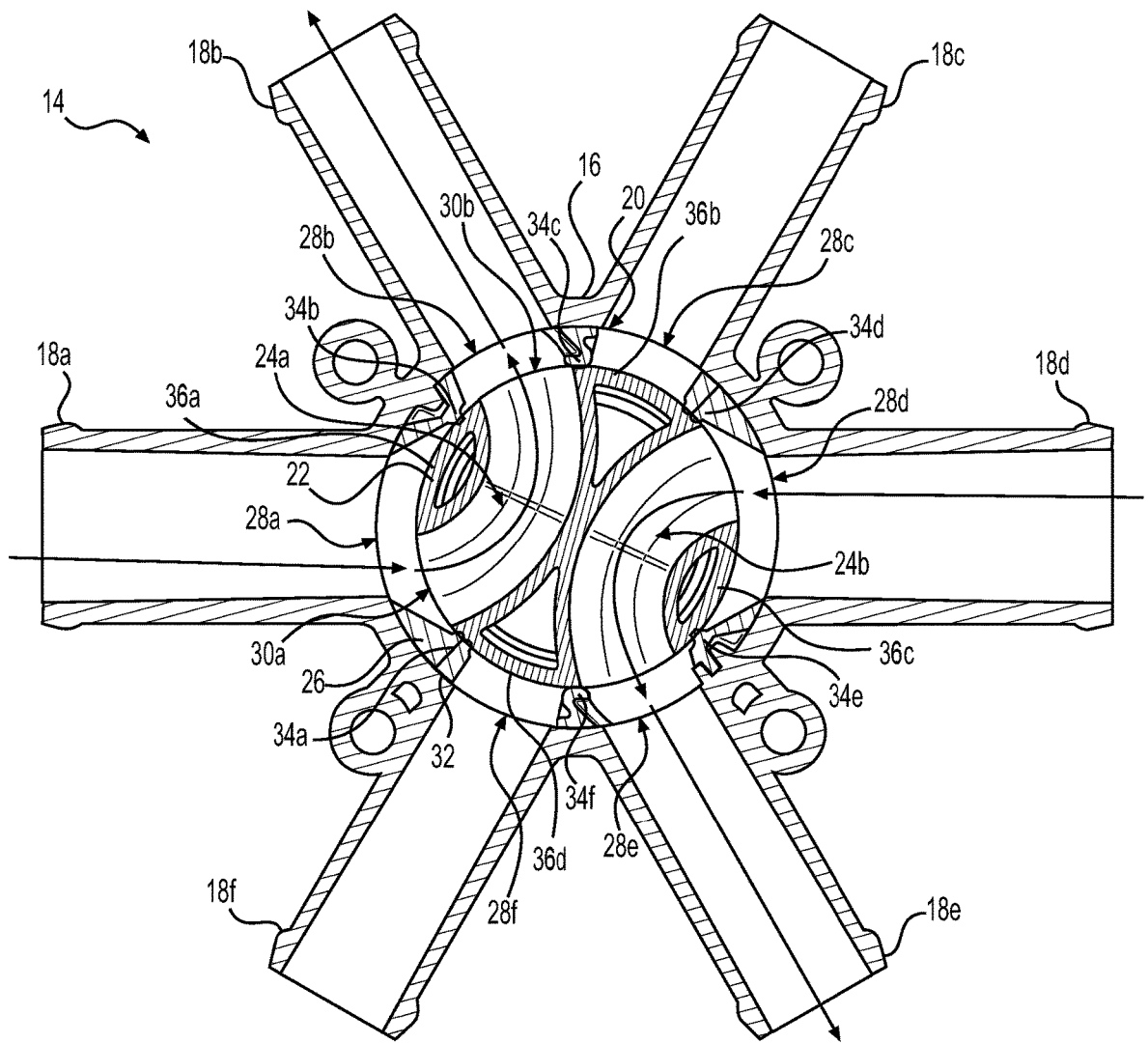
FIG. 3 is a cross-sectional illustration of the embodiment of the multi-port multi-mode valve of FIG. 1 with its shell body positioned to provide a first mode of operation.

The following discussion of specific structures in the multi-port, multi-mode valve 14 will be provided in relation to FIG. 3, but these structures can also be found in the depictions shown in FIGS. 4-8. Referring to FIG. 3, similar to the incorporated patent and applications referenced above, internal cavity 20 receives a generally cylindrical shell body 22 which operates as a valve member for controlling the flows between the plurality of ports 18a-f. This shell body 22 is configured to provide flow control logic between different ports 18a-f based on its angular position within the valve housing 16. As will be discussed more fully below, the shell body 22 includes a plurality of passageways 24a, 24b extending through the shell body 22. The cross-sectional flow area of each of the passageways 24a, 24b is approximately equal to the cross-sectional flow area of each of the outlet ports 18b, 18c, 18e, 18f as will be seen in FIG. 3.

A seal member 26 is also received in cavity 20 and surrounds the outer periphery of shell body 22 such that it circumscribes the shell body 22 within the internal cavity 20. This seal member 26 is a continuous cylindrical element, except for the openings 28a-f formed therein. As will be discussed below, seal member 26 is a single piece seal which advantageously creates a seal for each of the plurality of ports to prevent unintended cross flow or short circuiting.

The seal member 26 also advantageously entirely seals the internal cavity 20, such that no additional seals need be associated with the valve 14. It is possible, however, that the seal member 26 may also be formed as separate seal segments which immediately next to one another in the circumferential direction, which together define a seal member 26 which surrounds the shell body 22. The term "seal member" as used herein includes both configurations, i.e. a single unitary seal member, or a seal member formed of a plurality seal segments.

As will be seen in FIG. 3, the openings 28a, 28d formed through the seal member 26 and associated with the inlet ports 18a, 18d are configured differently from the openings 28b, 28c, 28e, 28f formed through the seal member 26 and associate with the outlet ports 18b, 18c, 18e, 18f Preferably, the openings 28a, 28d formed through the seal member 26 and associated with the inlet ports 18a, 18d are configured to increase the cross-sectional flow area to which the shell body 22 is exposed compared to the cross-sectional flow area of each of the inlet ports 18a, 18d themselves. That is, the openings 28a, 28d widen from the inlet port 18a, 18d toward the shell body 22. Preferably, the openings 28b, 28c, 28e, 28f formed through the seal member 26 and associated with the outlet ports 18b, 18c, 18e, 18f are configured to maintain the cross-sectional flow area to which the shell 22 body is exposed compared to the cross-sectional flow area of each of the outlet ports 18b, 18c, 18e, 18f themselves.

The shell body 22 includes a first opening 30a and leading into the first passageway 24a and a second opening 30b leading out of the first passageway 24a. The shell body 22 also includes a third opening 30c leading into the second passageway 24b and a fourth opening 30d leading out of the second passageway 24b. The portion of the shell body 22 around the openings 30a-d and passageways 24a, 24b is used to block the flow of fluid through the shell body 22. In this way, the shell body 22 defines a plurality of blockers 36a-d that, when situated in from of outlet ports 18b, 18c, 18e, 18f, prevent the flow of fluid through the outlet ports 18b, 18c, 18e, 18f. The openings 28a-f of the seal member 26 remain statically aligned with the ports 18a-f so that each opening 28a-f is associated with one port 18a-f and seals against an interior surface 32 of the housing 16 that defines the cavity 20 around the opening of the port 18a-f into cavity 20. The shell body 22 includes a valve stem (not shown) which extends through an opening in housing 16. This valve stem, and in turn the remainder of shell body 22, is rotatable about axis by an actuator as discussed above.

As will be recognized through an analysis of FIG. 3, the cross-sectional flow area of each of the passageways 24a, 24b through the shell body 22 is approximately equal to half of the cross-sectional flow area to which the shell body 22 is exposed at each of the inlet ports 18a, 18d. An area between each end of each of the passageways 24a, 24b is approximately equal to the cross-sectional flow area of each of the outlet ports 18b, 18c, 18e, 18f.

FIG. 3 also shows that the seal member 26 seals outwardly in a radial direction against an interior surface 32 of the housing 16. The seal member also includes a plurality of seal ribs 34a-f which seal against the shell body 22. The seal member 26 may be one of a continuous piece of elastomeric material, a plurality of pieces of elastomeric material, or comprises a rigid core with a plurality of elastomeric seals attached thereto.

As mentioned, the configuration of the ports 18a-f of the housing 16 and the passageways 24a, 24b of the shell body 22, as engaged by the seal member 26, provides flow logic the enables a plurality of modes of operation. In the illustrated embodiment having two inlet ports 18a, 18d and four outlet ports 18b, 18c, 18e, 18f, the flow logic provides six modes of operation. This flow logic allows flow from each of the inlet ports 18a, 18b to each of the outlet ports 18b, 18c, 18e, 18f individually in different modes of operation. The flow logic also prevents flow from each of the inlet ports 18a, 18b to each of the outlet ports 18b, 18c, 18e, 18f individually in different modes of operation. Advantageously, the flow logic also allows flow from each of the inlet ports 18a, 18b to a combination of the outlet ports 18b, 18c, 18e, 18f in different modes of operation With reference to each of FIG. 3-8, there are illustrated cross-sectional views of the multi-port multi-mode valve 14 of FIGS. 1 and 2 discussed hereinabove showing the orientation of the shell body 22 to provide the fluid logic enabled by rotation of the shell body 22. In order to aid in this description, the isometric cross-sectional views of FIGS. 3-8 also include flow arrows and blocked flow symbols to aid in the understanding of the operation of the valve 14.

However, it should be noted that the directional heads of the flow arrows shown in FIGS. 3-8 are not limiting on the flow direction through the valve 14, but instead only illustrate possible flows through the valve 14 based on the communication enabled by the positioning of the shell body 22. Indeed, flow in other directions is also possible based on the external plumbing and flow system, and flow in both directions at different times through the same ports based on these external factors is also possible.

In a first mode of operation shown in FIG. 3, the flow logic directs fluid flow from the first port 18a (inlet port) to the second port 18b (outlet port), from the fourth port 18d (inlet port) to the fifth port 18e (outlet port), and blocks fluid flow to the third port 18c and to the sixth port 18f with blockers 36b, 36d as described in Table 1 or vice versa (i.e., in through the second port 18b and out through the first port 18a and/or in through the fifth port 18e and out through the fourth port 18d), in certain implementations.

TABLE 1

Inlets, Outlets, and Block Ports in a First Mode of Operation

| Mode | Inlet | Outlet | Blocked |
|---|---|---|---|
| 1 | 18a<br>18d | 18b<br>18e | 18c & 18f |

Figure 4:
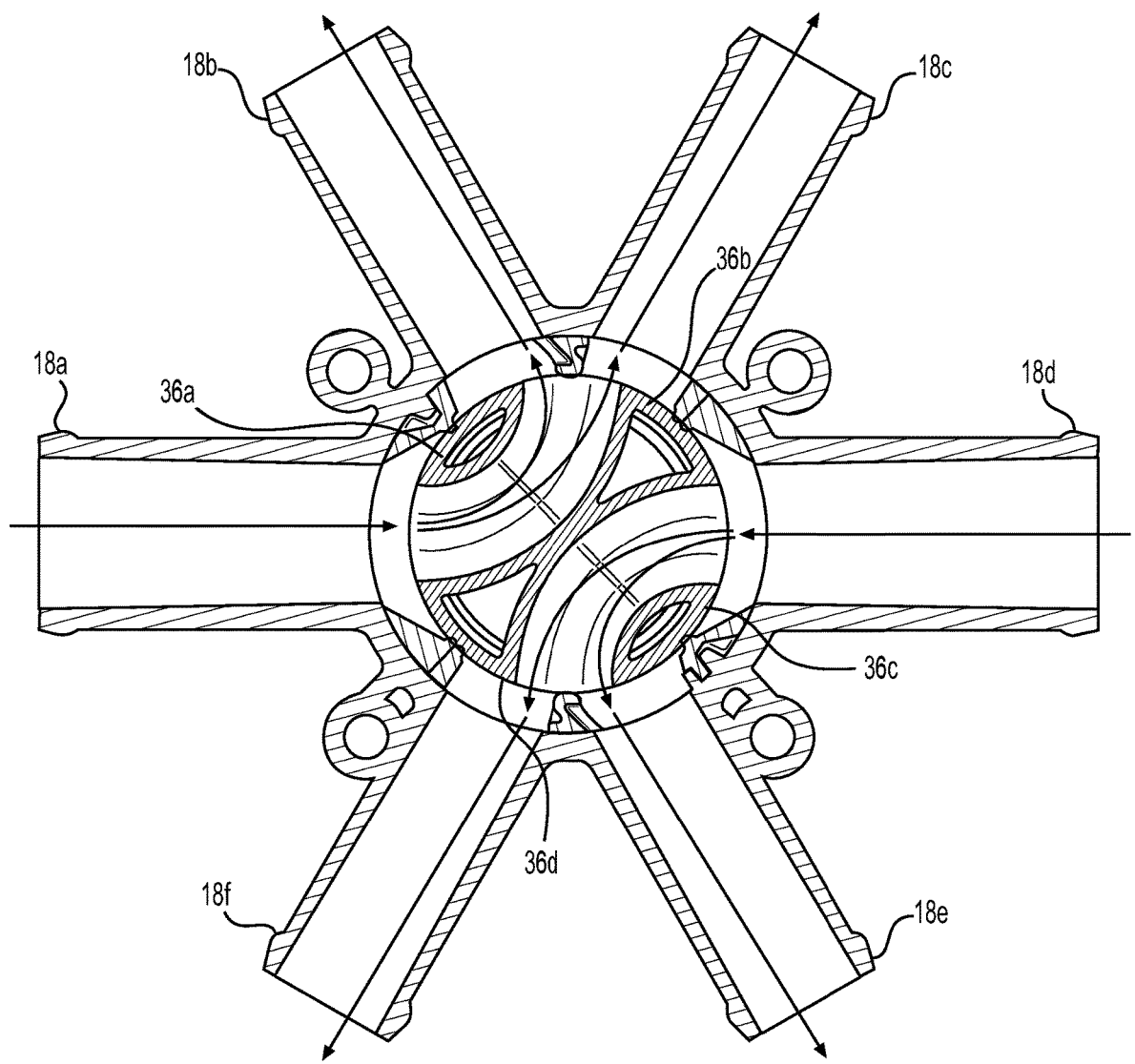
FIG. 4 is a cross-sectional illustration of the embodiment of the multi-port multi-mode valve of FIG. 1 with its shell body positioned to provide a second mode of operation.

In a second mode of operation shown in FIG. 4, the flow logic directs fluid flow from the first port 18a (inlet port) to the second port 18b and the third port 18c (outlet ports) and from the fourth port 18d (inlet port) to the fifth port 18e and sixth port 18f (outlet ports) as described in Table 2 or vice versa (i.e., in through the second and third ports 18b, 18c and out through the first port 18a and/or in through the fifth and sixth ports 18e, 18f and out through the fourth port 18d), in certain implementations. As can be seen in FIG. 4, none of the blockers 36a-d is exactly aligned with the outlet ports 18b, 18c, 18e, 18f to prevent fluid flow.

TABLE 2

Inlets, Outlets, and Block Ports in a Second Mode of Operation

| Mode | Inlet | Outlet | Blocked |
|---|---|---|---|
| 2 | 18a<br>18d | 18b & 18c<br>18e & 18f | N/A |

Figure 5:
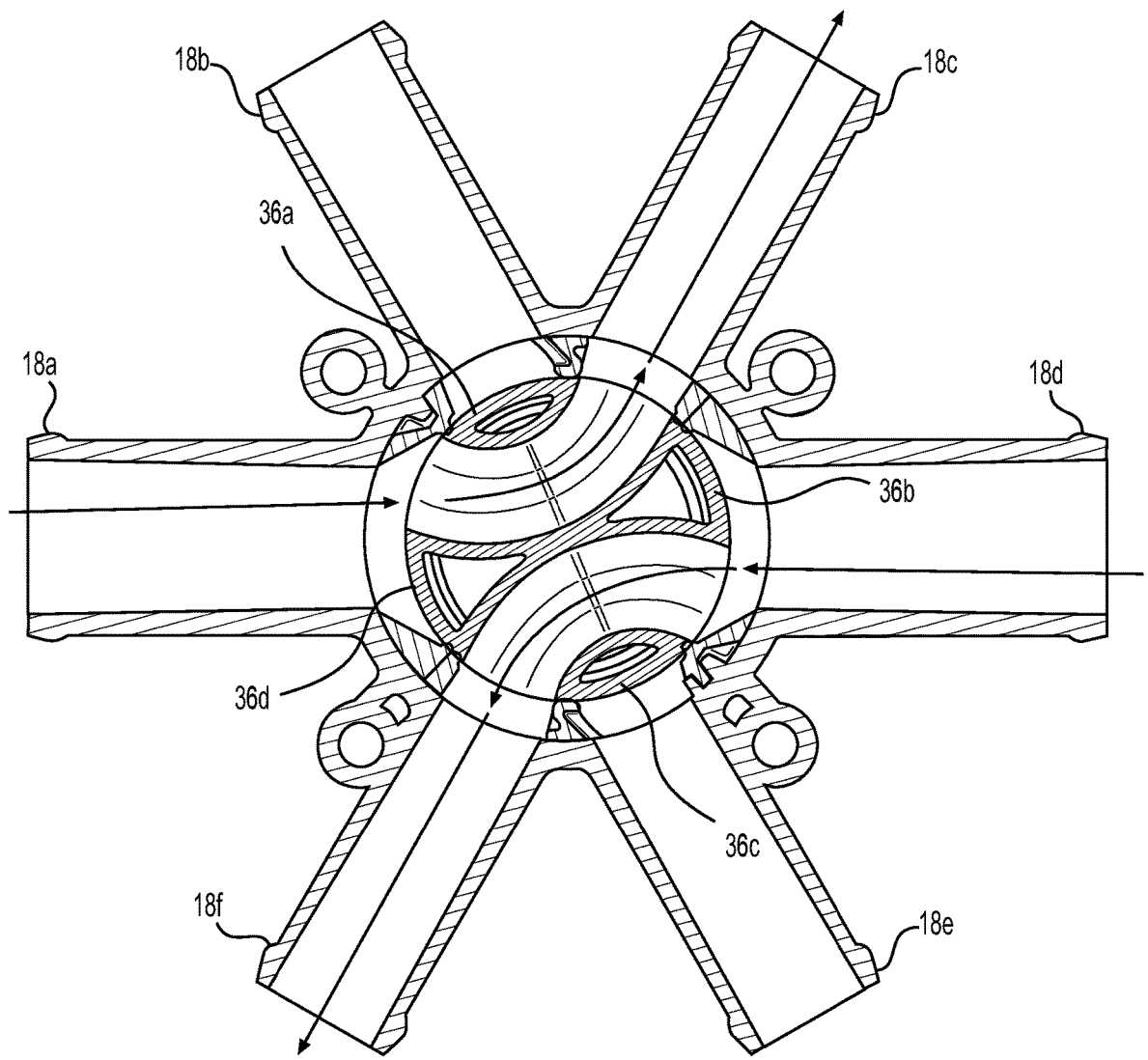
FIG. 5 is a cross-sectional illustration of the embodiment of the multi-port multi-mode valve of FIG. 1 with its shell body positioned to provide a third mode of operation.

In a third mode of operation shown in FIG. 5, the flow logic directs fluid flow from the first port 18a (inlet port) to the third port 18c (outlet port), from the fourth port 18d (inlet port) to the sixth port 18f (outlet port), and blocks fluid flow to the second port 18b and to the fifth port 18e with blockers 36a, 36c as described in Table 3 or vice versa (i.e., in through the third port 18c and out through the first port 18a and/or in through the sixth port 18f and out through the fourth port 18d), in certain implementations.

TABLE 3

Inlets, Outlets, and Block Ports in a Third Mode of Operation

| Mode | Inlet | Outlet | Blocked |
|---|---|---|---|
| 3 | 18a<br>18d | 18c<br>18f | 18b & 18e |

Figure 6:
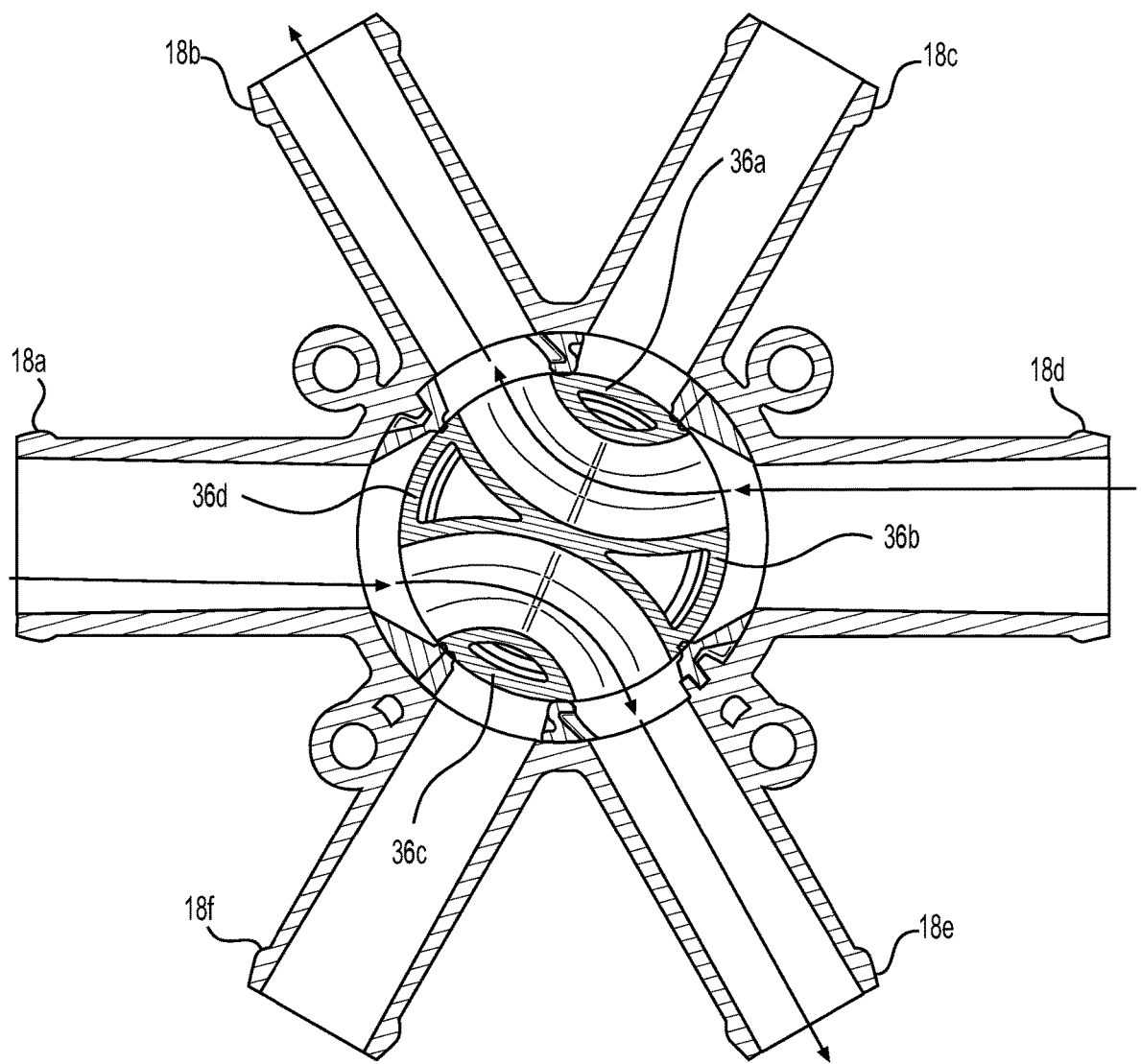
FIG. 6 is a cross-sectional illustration of the embodiment of the multi-port multi-mode valve of FIG. 1 with its shell body positioned to provide a fourth mode of operation.

In a fourth mode of operation shown in FIG. 6, the flow logic directs fluid flow from the first port 18a (inlet port) to the fifth port 18e (outlet port), from the fourth port 18d (inlet port) to the second port 18b (outlet port), and blocks fluid flow to the third port 18c and to the sixth port 18f with blockers 36a, 36c as described in Table 4 or vice versa (i.e., in through the fifth port 18e and out through the first port 18a and/or in through the second port 18b and out through the fourth port 18d), in certain implementations.

TABLE 4

Inlets, Outlets, and Block Ports in a Fourth Mode of Operation

| Mode | Inlet | Outlet | Blocked |
|---|---|---|---|
| 4 | 18a<br>18d | 18e<br>18b | 18c & 18f |

Figure 7:
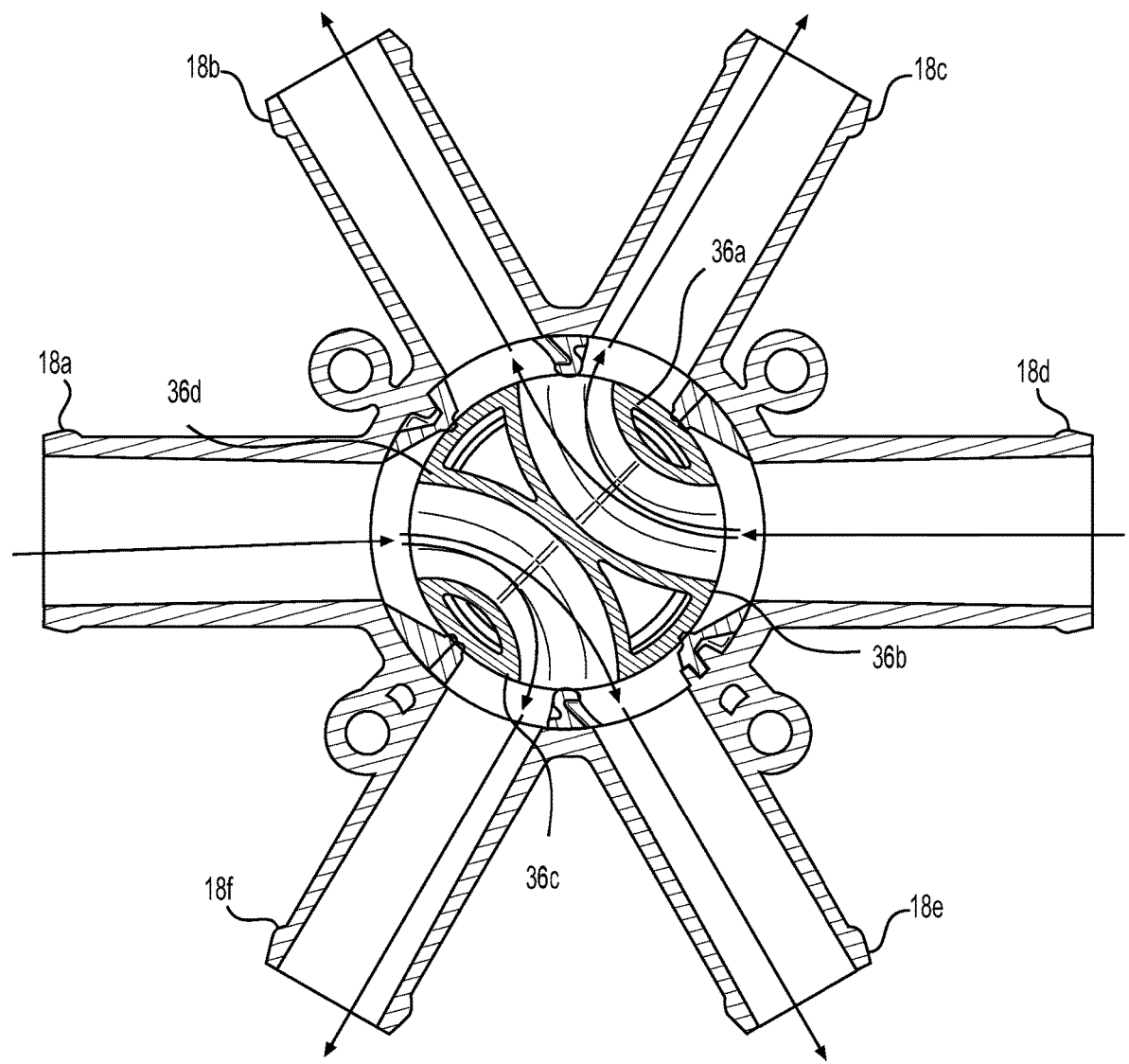
FIG. 7 is a cross-sectional illustration of the embodiment of the multi-port multi-mode valve of FIG. 1 with its shell body positioned to provide a fifth mode of operation.

In a fifth mode of operation shown in FIG. 7, the flow logic directs fluid flow from the first port 18a (inlet port) to the fifth port 18e and to the sixth port 18f (outlet ports) and from the fourth port 18d (inlet port) to the second port 18b and to the third port 18c (outlet ports) as described in Table 5 or vice versa (i.e., in through the fifth and sixth ports 18e, 18f and out through the first port 18a and/or in through the second and third ports 18b, 18c and out through the fourth port 18d), in certain implementations. As can be seen in FIG. 7, none of the blockers 36a-d is exactly aligned with the outlet ports 18b, 18c, 18e, 18f to prevent fluid flow.

TABLE 5

Inlets, Outlets, and Block Ports in a Fifth Mode of Operation

| Mode | Inlet | Outlet | Blocked |
|---|---|---|---|
| 5 | 18a | 18e & 18f | N/A |
|  | 18d | 18b & 18c |  |

Figure 8:
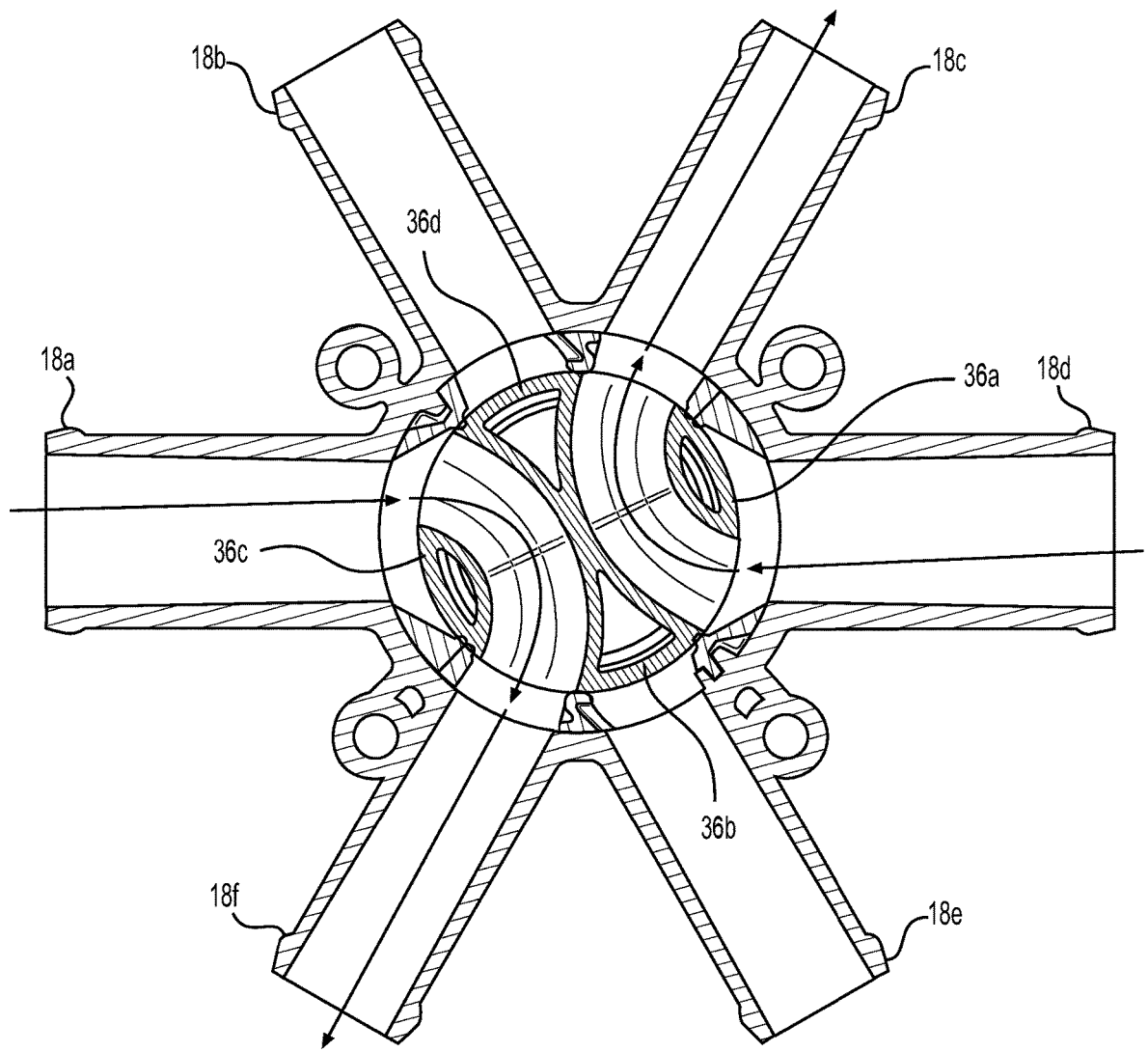
FIG. 8 is a cross-sectional illustration of the embodiment of the multi-port multi-mode valve of FIG. 1 with its shell body positioned to provide a sixth mode of operation.

In a sixth mode of operation shown in FIG. 8, the flow logic directs fluid flow from the first port 18a (inlet port) to the sixth port 18f (outlet port), from the fourth port 18d (inlet port) to the third port 18c (outlet port), and blocks fluid flow to second port 18b and to the fifth port 18e with blockers 36b, 36d as described in Table 6 or vice versa (i.e., in through the sixth port 18f and out through the first port 18a and/or in through the third port 18c and out through the fourth port 18d), in certain implementations.

TABLE 6

Inlets, Outlets, and Block Ports in First Mode of Operation

| Mode | Inlet | Outlet | Blocked |
|---|---|---|---|
| 6 | 18a | 18f | 18b & 18e |
|  | 18d | 18c |  |

A summary of the six different modes provided by the embodiment illustrated in FIGS. 1-8, including the inlet port to outlet port flow and port blockage, is illustrated in the summary Table 7.

TABLE 7

Summary of the Six Modes of Operation

| Mode | Inlet | Outlet | Blocked |
|---|---|---|---|
| 1 | 18a | 18b | 18c & 18f |
|  | 18d | 18e |  |
| 2 | 18a | 18b & 18c | N/A |
|  | 18d | 18e & 18f |  |
| 3 | 18a | 18c | 18b & 18e |
|  | 18d | 18f |  |
| 4 | 18a | 18e | 18c & 18f |
|  | 18d | 18b |  |
| 5 | 18a | 18e & 18f | N/A |
|  | 18d | 18b & 18c |  |
| 6 | 18a | 18f | 18b & 18e |
|  | 18d | 18c |  |

As described herein, embodiments of the present invention The multi-port multi-mode valve advantageously overcomes existing problems in the art by presenting an overall construction with a reduced part count, a reduced number of potential leak paths, and a reduction in overall assembly time and cost. In embodiments, the multi-port multi-mode valve has particular suitability for routing coolant in a thermal system, e.g., an engine or motor of a vehicle. For example, the multi-port multi-plane valve can be used to route coolant in a first thermal loop and at least one other thermal loop. In embodiments, a first thermal loop may be to route the coolant to engine/motor components or a battery in need of cooling or warming, and a second thermal loop may be provided to cool or warm the coolant (e.g., to a radiator, chiller, or heater). Depending on the particular needs of the coolant and the components to which it is being routed, the shell body is able to be rotated to direct the flow of coolant through the desired thermal loops.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A multi-port, multi-mode valve, comprising:
    a housing defining an internal cavity and comprising a plurality of ports, wherein each of the plurality of ports is in communication with the internal cavity, and wherein the plurality of ports includes a first inlet port, a second inlet port, a first outlet port, a second outlet port, a third outlet port, and a fourth outlet port; and
    a shell body rotatably disposed within the internal cavity to selectively provide fluid communication between the plurality of ports in six modes of operation; and
    wherein the fluid communication is provided from each of the first inlet port and the second inlet port in each of the six modes of operation.

2. A method of directing fluid flow through the multi-port, multi-mode valve of claim 1, comprising:
rotating the shell body within the internal cavity of the housing to provide fluid communication between the first inlet port and one or two of the first outlet port, the second outlet port, the third outlet port, or the fourth outlet port and between the second inlet port and one or two other of the first outlet port, the second outlet port, the third outlet port, or the fourth outlet port.

3. A multi-port, multi-mode valve, comprising:
a housing defining an internal cavity and comprising a plurality of ports, wherein each of the plurality of ports is in communication with the internal cavity, and wherein the plurality of ports includes a first inlet port, a second inlet port, a first outlet port, a second outlet port, a third outlet port, and a fourth outlet port;
a shell body rotatably disposed within the internal cavity to selectively provide fluid communication between the plurality of ports in six modes of operation; and
wherein the plurality of ports are arranged symmetrically around the housing.

4. The multi-port, multi-mode valve of claim 3, wherein the first inlet port is arranged diametrically opposed to the second inlet port.

5. The multi-port, multi-mode valve of claim 4, wherein the first outlet port and the second outlet port are arranged between the first inlet port and the second inlet port on one side of the housing and wherein the third outlet port and the fourth outlet port are arranged between the first inlet port and the second inlet port on an opposite side of the housing.

6. A multi-port, multi-mode valve, comprising:
a housing defining an internal cavity and comprising a plurality of ports, wherein each of the plurality of ports is in communication with the internal cavity, and wherein the plurality of ports includes a first inlet port, a second inlet port, a first outlet port, a second outlet port, a third outlet port, and a fourth outlet port;
a shell body rotatably disposed within the internal cavity to selectively provide fluid communication between the plurality of ports in six modes of operation; and
wherein the first inlet port and the second inlet port each comprise a first cross-sectional area, wherein the first outlet port, the second outlet port, the third outlet port, and the fourth outlet port each comprise a second cross-sectional area, and wherein the first cross-sectional area is greater than the second cross-sectional area.

7. The multi-port, multi-mode valve of claim 6, wherein the shell body comprises a first passageway and a second passageway, the first passageway configured to provide fluid communication between the first inlet port and one or more of the first outlet port, the second outlet port, the third outlet port, and the fourth outlet port, the second passageway configured to provide fluid communication between the second inlet port and one or more of the first outlet port, the second outlet port, the third outlet port, and the fourth outlet port.

8. The multi-port, multi-mode valve of claim 7, wherein the first passageway and the second passageway each comprise a third cross-sectional area, wherein the third cross-sectional area is less than the first cross-sectional area and substantially equal to the second cross-sectional area.

9. The multi-port, multi-mode valve of claim 7, further comprising a seal member disposed between the shell body and an interior surface of the housing, the seal member comprising a plurality of openings corresponding to each of the plurality of ports.

10. The multi-port, multi-mode valve of claim 9, wherein the seal member comprises a plurality of seal ribs that seal against the shell body.

11. The multi-port, multi-mode valve of claim 9, wherein the plurality of openings comprises a first inlet opening and a second inlet opening, wherein the first inlet opening and the second inlet opening each comprise an outer cross-sectional area and an inner cross-sectional area that is greater than the outer cross-sectional area, and wherein the outer cross-sectional area is substantially equal to the first cross-sectional area and widens to the inner cross-sectional area.

12. The multi-port, multi-mode valve of claim 11, wherein the plurality of openings further comprises outlet openings, each outlet opening having a cross-sectional area substantially equal to the second cross-sectional area.

13. A multi-port, multi-mode valve, comprising:
a housing defining an internal cavity and comprising a plurality of ports, wherein each of the plurality of ports is in communication with the internal cavity, and wherein the plurality of ports includes a first inlet port, a second inlet port, a first outlet port, a second outlet port, a third outlet port, and a fourth outlet port;
a shell body rotatably disposed within the internal cavity to selectively provide fluid communication between the plurality of ports in six modes of operation; and
wherein the first outlet port and the second outlet port are arranged between the first inlet port and the second inlet port on one side of the housing, wherein the third outlet port and the fourth outlet port are arranged between the first inlet port and the second inlet port on an opposite side of the housing, and wherein the first outlet port and the fourth outlet port are adjacent to the first inlet port and the second outlet port and the third outlet port are adjacent to the second inlet port.

14. The multi-port, multi-mode valve of claim 13, wherein the six modes of operation comprises a first mode in which the first inlet port is in fluid communication with the first outlet port, the second inlet port is in fluid communication with the third outlet port, and fluid flow to the second outlet port and the fourth outlet port is blocked.

15. The multi-port, multi-mode valve of claim 14, wherein the six modes of operation comprises a second mode in which the first inlet port is in fluid communication with the first outlet port and the second outlet port and the second inlet port is in fluid communication with the third outlet port and the fourth outlet port.

16. The multi-port, multi-mode valve of claim 15, wherein the six modes of operation comprises a third mode in which the first inlet port is in fluid communication with the second outlet port, the second inlet port is in fluid communication with the fourth outlet port, and fluid flow to the first outlet port and the third outlet port is blocked.

17. The multi-port, multi-mode valve of claim 16, wherein the six modes of operation comprises a fourth mode in which the first inlet port is in fluid communication with the third outlet port, the second inlet port is in fluid communication with the first outlet port, and fluid flow to the second outlet port and the fourth outlet port is blocked.

18. The multi-port, multi-mode valve of claim 17, wherein the six modes of operation comprises a fifth mode in which the first inlet port is in fluid communication with the third outlet port and the fourth outlet port and the second inlet port is in fluid communication with the first outlet port and the third outlet port.

19. The multi-port, multi-mode valve of claim 18, wherein the six modes of operation comprise a sixth mode in which the first inlet port is in fluid communication with the fourth outlet port, the second inlet port is in fluid communication with the second outlet port, and fluid flow to the first outlet port and the third outlet port is blocked.

\* \* \* \* \*